US006204214B1

(12) United States Patent
Singh et al.

(10) Patent No.: US 6,204,214 B1
(45) Date of Patent: Mar. 20, 2001

(54) PUMPABLE/INJECTABLE PHOSPHATE-BONDED CERAMICS

(75) Inventors: Dileep Singh, Naperville; Arun S. Wagh, Orland Park, both of IL (US); Lamar Perry, Fontana, CA (US); Seung-Young Jeong, Justice, IL (US)

(73) Assignee: University of Chicago, Chicago, IL (US)

( * ) Notice: Subject to any disclaimer, the term of this patent is extended or adjusted under 35 U.S.C. 154(b) by 0 days.

(21) Appl. No.: 09/124,822

(22) Filed: Jul. 29, 1998

Related U.S. Application Data (63) Continuation-in-part of application No. 08/617,284, filed on Mar. 18, 1996, now Pat. No. 5,830,815, and a continuation-in-part of application No. 08/619,945, filed on Mar. 18, 1996, now Pat. No. 5,846,894.

(51) Int. Cl.[7] ............................ C04B 18/04; C04B 35/04; C04B 12/02
(52) U.S. Cl. .......................... 501/155; 501/109; 501/111; 501/119; 501/153; 501/108; 106/690; 106/691; 588/10; 588/12; 588/252; 588/256; 588/901
(58) Field of Search ..................................... 106/690, 691; 501/155, 109, 111, 116, 118, 119, 153, 108; 588/10, 12, 252, 256, 901, 9

(56) References Cited

U.S. PATENT DOCUMENTS

| | | | | |
|---|---|---|---|---|
| 2,391,493 | * | 12/1945 | Wainer et al. | 106/691 |
| 3,357,843 | * | 12/1967 | Bowman | 501/111 |
| 3,392,037 | * | 7/1968 | Neely et al. | 501/111 |
| 3,540,897 | * | 11/1970 | Martinet | 501/111 |
| 3,647,488 | * | 3/1972 | Brigham et al. | 501/111 |
| 3,920,464 | * | 11/1975 | Damiamo | 501/111 |
| 3,923,534 | * | 12/1975 | Cassidy | 501/109 |
| 3,960,580 | * | 6/1976 | Stierli et al. | 501/111 |
| 4,160,673 | * | 7/1979 | Fujita et al. | 501/155 |
| 4,275,091 | * | 6/1981 | Cassens, Jr. | 501/118 |
| 4,298,391 | * | 11/1981 | Hayase et al. | 501/119 |
| 4,347,325 | * | 8/1982 | Michel et al. | 501/153 |
| 4,444,594 | * | 4/1984 | Paddison et al. | 106/801 |
| 4,459,156 | * | 7/1984 | Henslee et al. | 106/691 |
| 4,836,854 | * | 6/1989 | Bierman et al. | 501/111 |
| 4,843,044 | * | 6/1989 | Neville et al. | 501/111 |
| 4,921,536 | * | 5/1990 | Rechter | 501/154 |
| 4,939,033 | * | 7/1990 | Daussan et al. | 106/DIG. 4 |
| 5,382,289 | * | 1/1995 | Bambauer et al. | 106/691 |
| 5,518,541 | * | 5/1996 | Fogel et al. | 106/691 |
| 5,650,121 | * | 7/1997 | Dody et al. | 106/691 |

* cited by examiner

*Primary Examiner*—Michael Marcheschi
(74) *Attorney, Agent, or Firm*—Cherskov & Flaynik

(57) ABSTRACT

A pumpable ceramic composition is provided comprising an inorganic oxide, potassium phosphate, and an oxide coating material. Also provided is a method for preparing pumpable ceramic-based waste forms comprising selecting inorganic oxides based on solubility, surface area and morphology criteria; mixing the selected oxides with phosphate solution and waste to form a first mixture; combining an additive to the first mixture to create a second mixture; adding water to the second mixture to create a reactive mixture; homogenizing the reactive mixture; and allowing the reactive mixture to cure.

17 Claims, 5 Drawing Sheets

PUMPABLE/INJECTABLE PHOSPHATE-BONDED CERAMICS

This patent application is a Continuation-In-Part of Ser. No. 08/617,284 filed on Mar. 18, 1996, now U.S. Pat. No. 5,830,815 and Ser. No. 08/619,945 filed on Mar. 18, 1996, now U.S. Pat. No. 5,846,894.

STATEMENT REGARDING FEDERALLY SPONSORED RESEARCH OR DEVELOPMENT

The United States Government has rights in this invention under Contract No. W-31-109-ENG-38 between the U.S. Department of Energy and the University of Chicago representing Argonne National Laboratory.

BACKGROUND OF THE INVENTION

1. Field of the Invention

This invention relates to a pumpable/injectable ceramic, and more particularly this invention relates to a ceramic composition that maintains low viscosity for extended periods of time to allow the composition to be pumped or injected into hard to reach geologic or manmade locations.

2. Background of the Invention

Disposal of hazardous waste, low-level radioactive waste or benign waste continues to present problems. Landfill space is becoming more scarce so that only nonrecyclable material or nonbiodegradable material is often considered the only candidates for land filling.

When hazardous material is land filled, care must be taken to prevent destabilization of the material, so that leaching will not occur.

Aside from land filling, efforts have been made to combine to-be-disposed-of-material with cement so as to form solid monoliths or waste forms for burial or for use as structural products. For example, U.S. Pat. No. 4,432,666 to Frey et al., discloses using cement and other water repellant binders to dispose of waste thought to be damaging to the environment. However, cement is unstable in many situations, for example when attempts are made to encapsulate halogenated materials.

U.S. Pat. No. 3,093,593 to Arrance discloses a method for vitrifying silicate materials to encapsulate radioactive waste. However, temperatures of up to 1,400° C. are required to produce final waste forms.

In U.S. Pat. No. 5,645,518, awarded to the instant Assignee, a method to stabilize low-level mixed wastes, such as radioactive medical wastes and other such materials, is provided, wherein phosphate ceramics physically and chemically stabilize the waste at ambient temperatures. However, in such endeavors, final waste forms rapidly set. This rapid-setting feature causes various degrees of unworkability to the process, particularly in situations where low viscosity and long operational times are required. Such situations include where the material is to be blown, poured or injected into deep wells or crevices, in-situ stabilization of buried wastes, remediation at nuclear-accident and waste spillage sites, and pumpable refractory applications.

In addition to the drawbacks of the above-mentioned processes, commercially supplied materials for use as components (particularly the oxides) of the above processes are in forms adverse to formulating flowable mixtures. As a result, exothermic reactions become uncontrollable, leading to thicker slurries, with the final product lacking homogeneity. Also, the resulting rapid setting time of the ceramic does not provide adequate working time.

A need exists in the art for a formulation and a waste encapsulation process to accommodate stabilization of a myriad of waste materials in a myriad of deposition scenarios. The formulation and process should provide waste liquors having protracted, workable consistencies or viscosities to accommodate currently available pump- injection-, or spray application-equipment. The process should also provide a protocol for selecting and preparing components of the formulation so as to tailor the formulation for situations requiring varying degrees of viscosity.

SUMMARY OF THE INVENTION

It is an object of the present invention to provide a formulation comprising waste and waste-encapsulation material that overcomes many of the disadvantages of the prior art.

It is another object of the present invention to provide a method for using waste as a bulk-component in pumpable hardening agents. A feature of the invention is the use of additives to slow the reaction between components of the hardening agents. An advantage of the invention is the extension of time of workability. Another advantage is the employ of heretofore unusable waste.

Still another object of the present invention is to provide a means for converting commonly available oxides into a component in pumpable hardening agents. A feature of the invention is calcining the oxides and then mixing the calcined oxides with coating agents. An advantage of the invention is the reduction in reaction rate of the calcined oxide in relation to the other components of the hardening agents, leading to extended workability time of the hardening agent prior to curing.

Yet another object of the present invention is to provide selection criteria for oxides to be used in the production of pumpable ceramic hardening formulations. A feature of the invention is the use of solubility, porosity and morphology characteristics of the oxides to differentiate acceptable oxides from unacceptable oxides. An advantage of the invention is that the characteristics are determinable prior to mixing or forming of waste forms. Another advantage is that oxides having the desired characteristics can be produced via calcination.

Briefly, the invention provides pumpable ceramic composition comprising an inorganic oxide, potassium phosphate, and an oxide coating material.

Also provided is a pumpable ceramic-based waste formulation comprising 7 to 14 weight percent MgO, 25 to 40 weight percent $KH_2PO_4$, 15 to 50 weight percent ash, 1 to 4 weight percent boric acid, 0.5 to 2 weight percent lignosulfonate, and 15 to 25 weight percent water.

The invention also provides a method for preparing pumpable ceramic-based waste forms comprising selecting inorganic oxides based on solubility, surface area and morphology criteria; mixing the selected oxides with phosphate solution and waste to form a first mixture; combining an additive to the first mixture to create a second mixture; adding water to the second mixture to create a reactive mixture; homogenizing the reactive mixture; and allowing the reactive mixture to cure.

BRIEF DESCRIPTION OF THE DRAWING

The present invention together with the above and other objects and advantages may best be understood from the following detailed description of the embodiment of the invention illustrated in the drawings, wherein.

DETAILED DESCRIPTION OF THE INVENTION

The inventors have found a method for incorporating wastes into pumpable or sprayable mixtures which in turn are used to fixate the wastes in hard-to-reach locations. Also, solely the binders from such mixtures can be utilized and combined with waste in situ for encapsulation, particularly in situations wherein the waste is located in inaccessible or dangerous areas such as the sarcophagus of a contaminated nuclear power plant, or waste spillage sites. Generally, the method retards the setting action of phosphate ceramics and also reduces the overall viscosity of the phosphate ceramic slurry or the phosphate ceramic/waste slurry long enough to allow the slurry to be pumped, sprayed or otherwise transported to final points. Ultimately, the method produces a hard, impenetrable waste form rivaling the durability of concrete forms, and without the addition of heat.

The inventors also disclose herein a process for selecting appropriate oxides for use as a component of the free flowing binder. Also disclosed is a process for pretreating common oxides for subsequent use as a component of the free-flowing binder, as mentioned supra.

As to the first aspect of the invention, pumpable ceramic, waste-encapsulating binder has been developed. The inventors have found that the addition of certain compounds coats the components of waste binders and serves to slow the setting-reaction to the point where setting or curing is retarded long enough for the reacting ceramic-waste liquor to be pumped, sprayed, or otherwise deposited in its final resting place. Once deposited, the ceramic waste liquor is allowed to cure or set up to its very dense, final form. Despite the use of coating materials to slow reaction speeds, the final product proves to be harder than those produced using Portland cement. Compression strengths of more than 4,000 pounds per square inch are typical.

Figure 1:
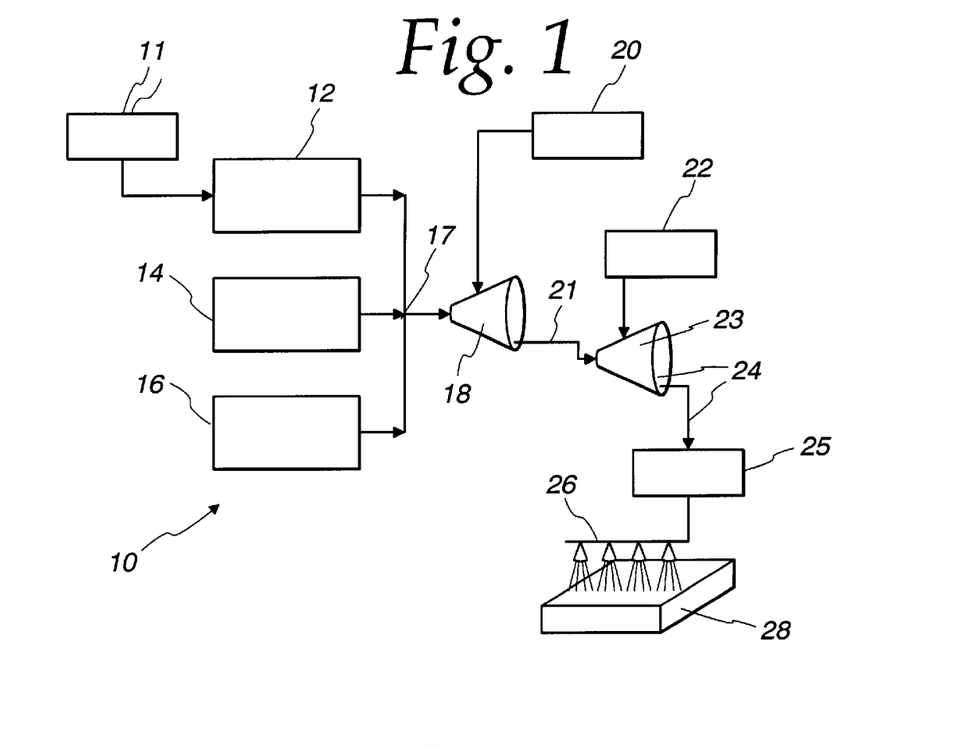
FIG. 1 is a schematic diagram of a process for producing pumpable ceramic waste forms, in accordance with features of the present invention.

Fabrication of the pumpable waste-encapsulation material is shown schematically as numeral 10 in FIG. 1. Briefly, oxide powder 12 is mixed with phosphate powder/solution 14 and previously sized waste material 16 in a first mixing process 17 and in various proportions.

Waste material of a size less than 200 microns is suitable. A myriad of phosphate solutions can be utilized including phosphates having cation moieties selected from the group consisting of potassium, sodium, calcium, zirconium, iron, magnesium-ammonium, and combinations thereof. A suitable concentration of phosphate solution is one which creates a slurry which when combined with other ingredients enumerated below, provides a liquor with a centipoise value that facilitates easy dispersion. Once such phosphate concentration is where the weight ratio of water to $KH_2PO_4$ is approximately 0.66.

The mixing of the oxide powder, the phosphate solution and the waste creates a first mixture or slurry 18. Optionally, the oxide powder is subjected to a pretreatment process 11 prior to mixing with the phosphate solution and waste material. Details of the oxide pretreatment process are disclosed infra.

Suitable oxide: phosphate: waste weight proportions range from 1:3.4:1.45 to 1:3.4:6.6. When MgO is utilized as the oxide, $KH_2PO_4$ as the phosphate and ash as the waste material, a particularly suitable $MgO:KH_2PO_4$:Ash weight ratio is 1:3.4:1.45.

In one exemplary procedure, the slurry 18 is contacted with additives 20 comprising various coating agents and water "getters" to create a second mixture 21. However, the additives could be added at separate points in the mixing process. For example, coating agents, including but not limited to citric acid or boric acid, can be added directly to the oxide powder 12 prior to the formation of mixing of the oxide with the phosphate solution and waste material. Then, a water getter such as a lignosulphonate can be added after the above three components are thoroughly mixed together.

After integration of the additives, water 22 is added to the resulting mixture and the now-hydrated liquor is mixed in a second mixing stage 23 to create a homogenous, reacting liquor 25. Mixing times of approximately 20 minutes to 60 minutes are typical.

The addition of water begins the reaction process 24. It is during the reaction process 24 that the now-reacting liquor 25 can be pumped, jet grouted or otherwise manipulated 26 prior to final setting occurring. Setting, stabilization or curing 28 of the liquor 25 occurs no earlier than 2 hours after the water addition step 22, discussed above.

A salient feature of the invented process is that no externally-applied heat is required to effect reaction, pumping, transporting and ultimately curing of the ceramic-waste liquor.

Figure 2:
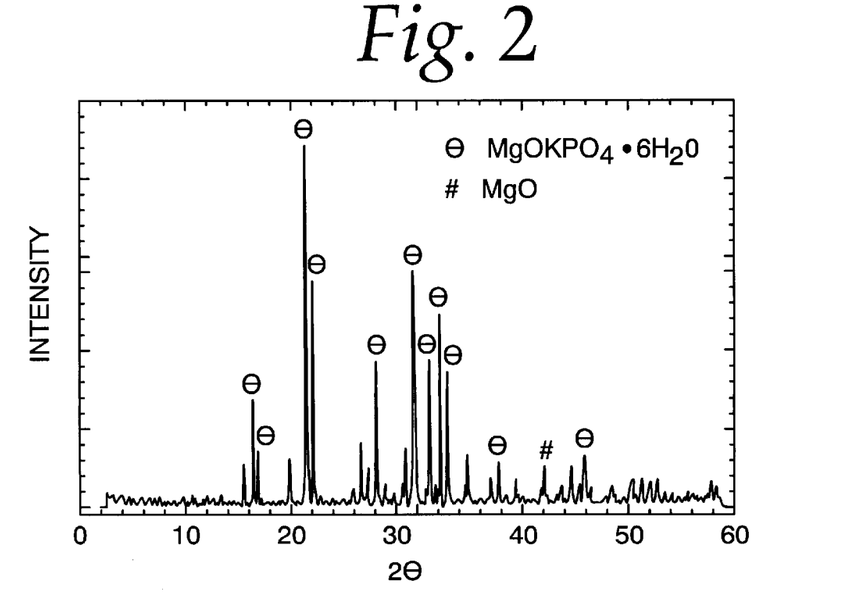
FIG. 2 is an x-ray diffraction analysis of the invented pumpable ceramic waste form.

Despite the fact that additives are used to fluidize the reaction liquor, the resulting final, cured waste form exhibits superior qualities. For example, and as depicted in FIG. 2, the process yields a waste form primarily comprising magnesium potassium phosphate crystalline phase, whereby the crystalline phase is represented by sharp peaks on the graph.

Oxide Preparation Detail

A myriad of oxides are suitable powders for the invention. Calcium oxide, sodium oxide, zirconium oxide, iron oxide, magnesium oxide and combinations thereof are all appropriate starter powders.

The inventors have found that pretreatment 11 of the oxide often enhances the flowability of the resulting ceramic binder-waste mixture. However, pretreated oxide as supplied by commercial suppliers does not provide the desired enhancements to flowability. Rather, the invented calcining process disclosed herein yields a binder with optimal properties such as high strength and low porosity. Setting rates of approximately two hours, low exothermicity (i.e., low heat generation) even during setting, and a very homogenous structure result from employing the invented oxide pretreatment process 11.

To produce suitable ceramic-binder, the oxide component should have the following properties:

1. Average oxide particle sizes should be approximately 8 to 10 microns. Each particle should be dense, crystalline, and free from any amorphous coating.

2. The oxide particles used should not result in substantial heating of the ceramic binder-waste mixture during mixing. Also, the oxide particle selection should not result in slurry thickening.

3. The final product should be a homogenous ceramic and should not result in precipitates forming in the slurry. Ultimate compression strength should be at least 3,500 pounds per square inch. Open or connected porosity of the product should be approximately less than 10 percent by volume of the entire monolith as formed and cured.

The inventors have found that oxides which do not satisfy the above enumerated parameters are not suitable for use in the stabilization of radioactive waste, or in applications for producing high volume structural products. As such, the following three test criteria have been developed for determining the suitability of oxides. The criteria can be applied to oxides provided by typical suppliers, or can be applied to determine the efficacy of oxide pretreatment methods employed on site by end users or others.

Figure 5:
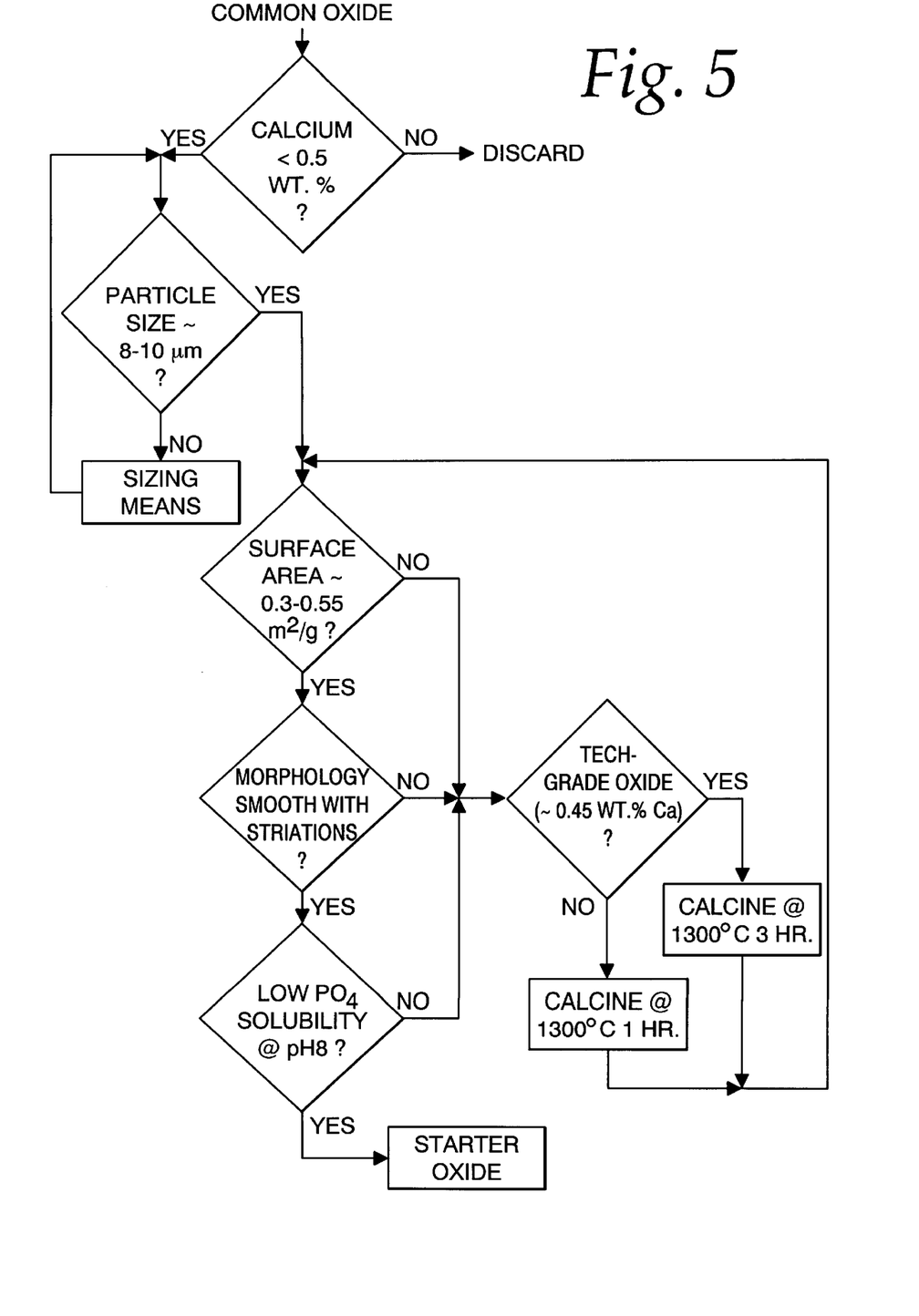
FIG. 5 is a decision tree for determining suitable oxides, in accordance with features of the present invention.

As illustrated in the decision tree depicted in FIG. 5, all three of the following criteria should be satisfied to qualify an oxide as a suitable component in a flowable ceramic binder for waste:

A.) Surface area: Surface area of the powder should be in the range of 0.3 to 0.55 $m^2/g$. Otherwise, the inventors have found that lower surface area results from agglomeration of the particles which in turn inhibits reaction between the oxide and other reactants. Surface areas above the desired range results in an accelerated reaction rate, leading to the slurry over heating, in some cases causing the slurry to boil. Surface areas of commercially available oxides are approximately 4 $m^2/g$.

Figure 3A:
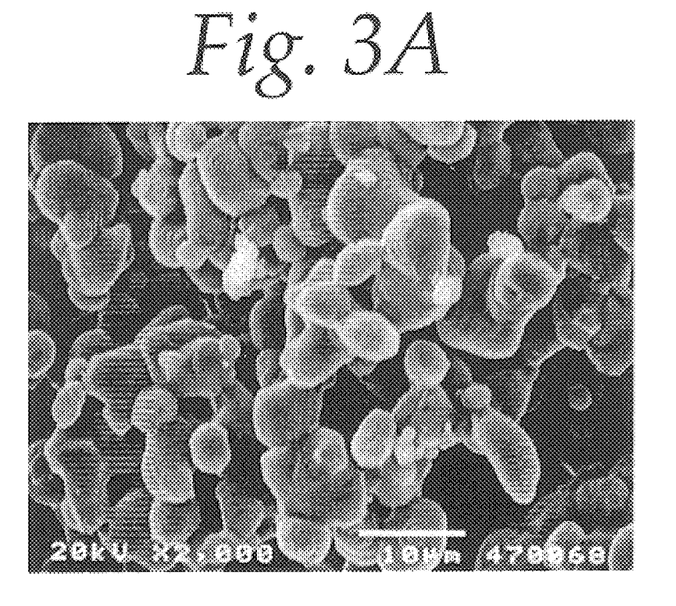
FIGS. 3A and 3B are photomicrographs depicting acceptable and unacceptable oxide components, respectively, of a ceramic formulation, in accordance with features of the present invention.
Figure 3B:
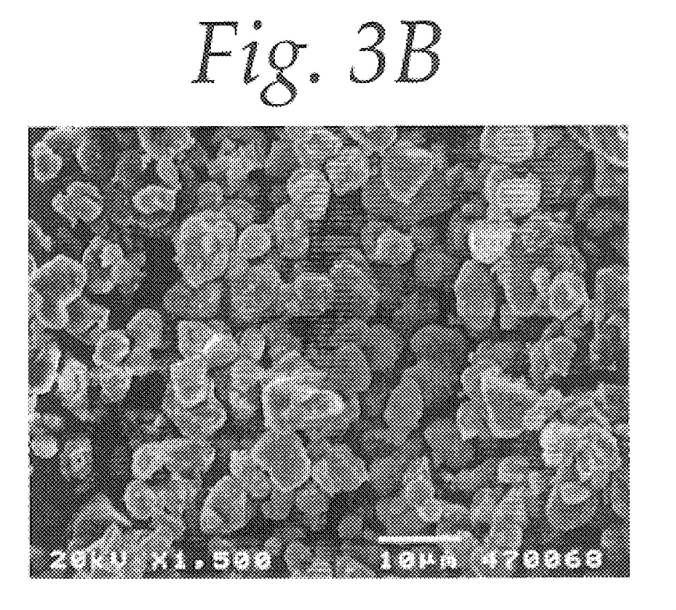

B.) Morphology: Under a high resolution microscope (i.e., approximately 1500×), oxide particle surfaces should appear smooth and with striations indicating crystalline structure. Examples of acceptable and unacceptable morphologies are depicted as FIGS. 3A and 3B, respectively.

Figure 4A:
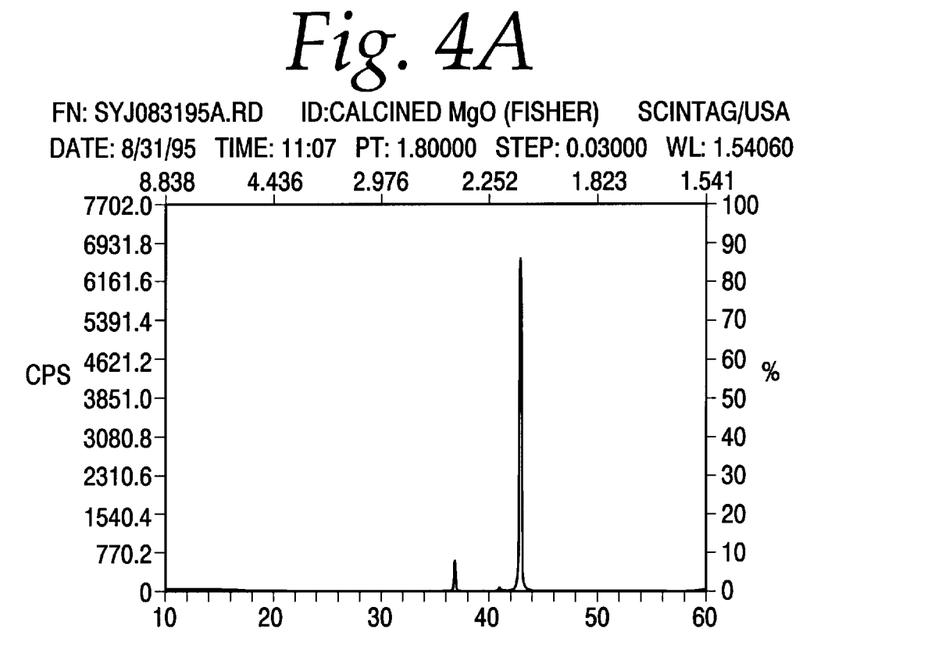
FIGS. 4A and 4B are x-ray diffraction analysis of acceptable and unacceptable oxide components for use in the invented pumpable formulation.
Figure 4B:
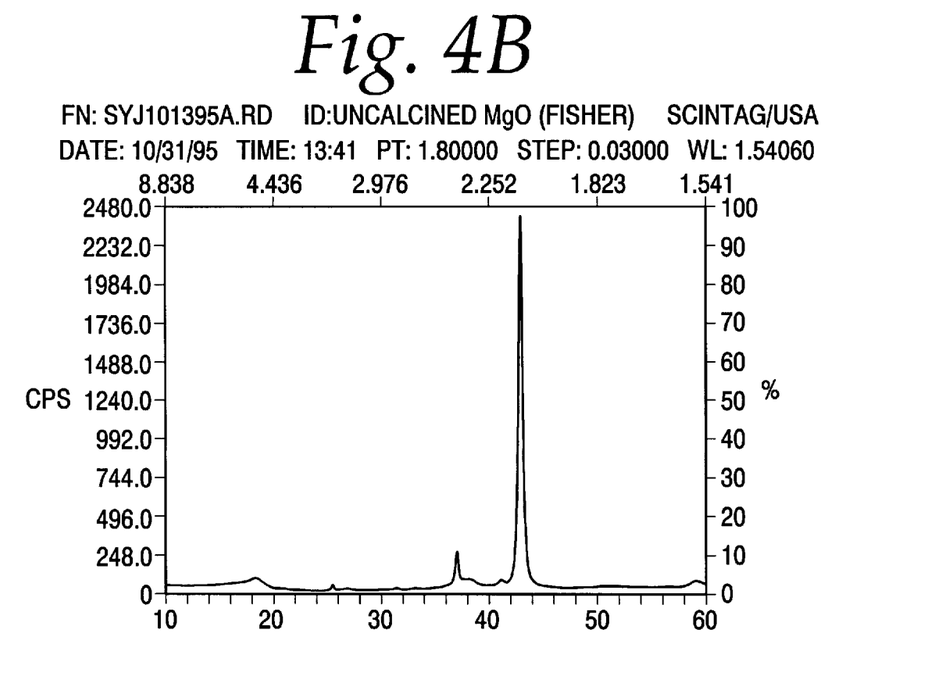

Aside from visual, albeit microscopic inspection, of oxide candidates, x-ray diffraction analysis also allows determination of sufficient crystalline structure in the oxides. For example, suitable oxides (FIG. 4A) exhibit sharp peaks, indicative of crystalline structure, whereas unsuitable oxides (FIG. 4B) exhibit broad peaks, which is indicative of the presence of amorphous materials. Amorphous materials react fast and generate unwanted excess heat in the slurry.

C.) Solubility: Solubility of the oxide in a solution of phosphoric acid also distinguishes between acceptable and unacceptable oxide. Generally, the less soluble the oxide is, the more suitable it is for producing a flowable ceramic material, which will solidify into an impenetrable mass. Lower oxide solubility results in more MgO particles present after reaction and therefore more nucleation sites existing in the reaction liquor. These nucleation sites help form individual centers of hardness which adds to the overall strength of the final waste form.

Figure 6:
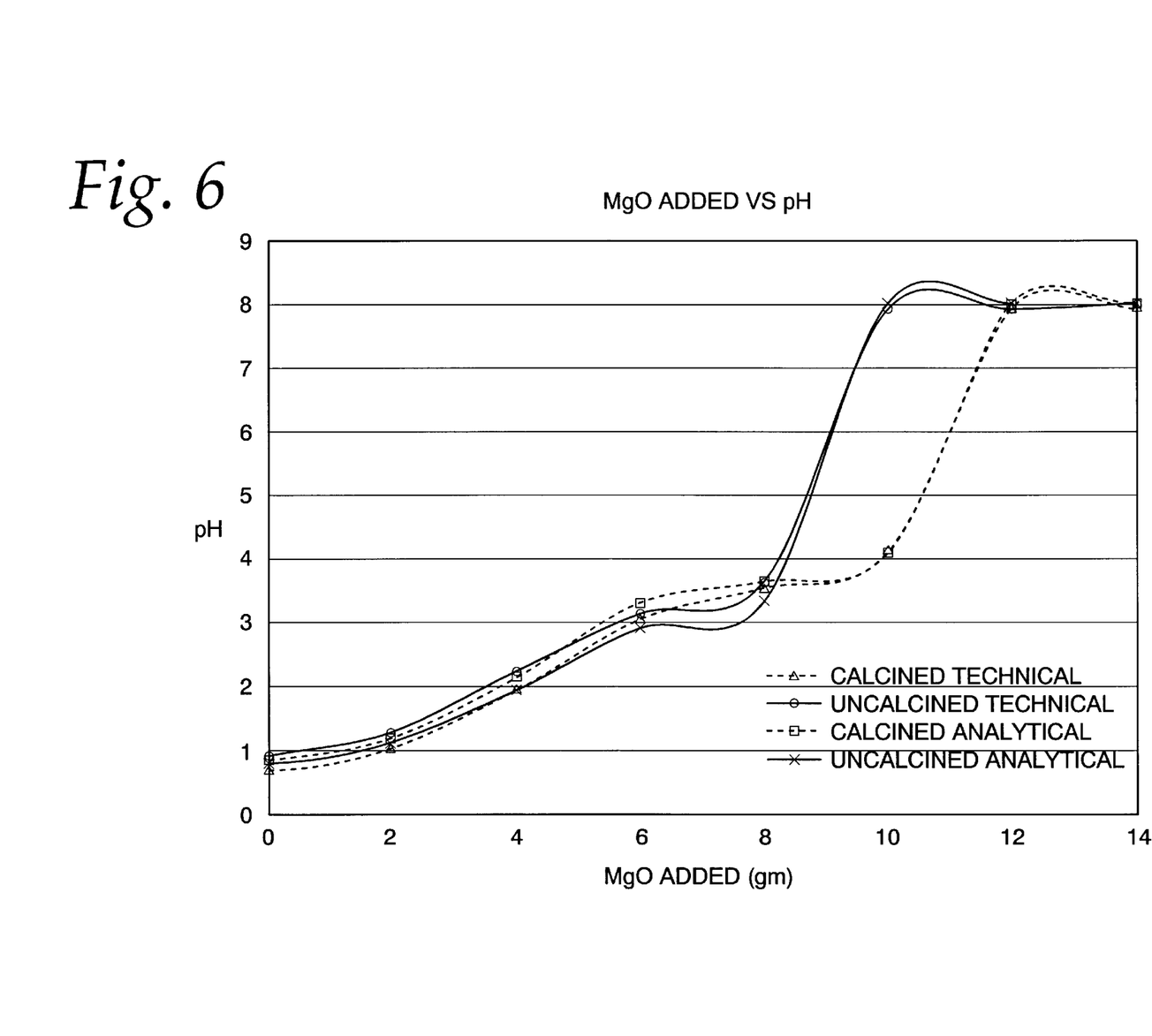
FIG. 6 is a solubility curve of various oxides, in accordance with features of the present invention.

FIG. 6 depicts a graph showing two acceptable oxides (dotted lines) and two unacceptable oxides (solid lines). As illustrated, 20 percent more (by weight) of the acceptable oxides are necessary to bring an acid-oxide solution to pH 8 compared to the amount required of unacceptable oxides. Initial impurity levels of the suitable oxides do not effect their solubilities. For example, the more soluble oxides (i.e., the acceptable oxides) depicted in FIG. 5 had varying levels of calcium contaminants with one oxide (analytical grade) containing 0.05 weight percent calcium and the other acceptable oxide (technical grade) containing 0.45 weight percent calcium.

Solubility testing of oxide candidates are conducted as follows: A 30 milliliter solution of 5 percent $H_3PO_4$ in deionized water is kept in constant agitation, via a magnetic stirrer or other means. One gram of MgO is added to the solution and the resulting mixture is allowed to equilibrate, with pH recorded. Additional MgO is added, one gram at a time, with equilibration allowing to occur. The procedure is continued until the pH reaches 8.

The inventors have found that one method for obtaining oxide satisfying criteria A–C stated above is through a calcining process. If commercial MgO is to be used, the oxide first must be sized to between 8 and 10 microns, as noted supra. Calcium content of the oxide should not exceed 0.5 weight percent.

Once the calcium content and particle size of the oxide is determined to be suitable, the oxide is placed in a furnace maintained at 1,300° C. The oxide could be placed in a "preheated" furnace or present during temperature ramp-up. Soaking or heating time of the oxide will vary depending on the source (and therefore impurity) levels of the oxide. Highly pure (analytical grade) oxide is soaked for approximately one hour while technical grade is heated for approximately three hours.

After heating, the samples remain in the furnace during cool down. The resulting, now-cooled oxide usually presents as an agglomerated mass, which must be reground or sized to 8 to 10 micron levels.

Additive Agent Detail

As noted supra, a salient feature of the invention is the use of additives to stymie reaction and therefore extend workability of the reaction liquor 25. The additives can comprise two components: a coating agent and a water "getter" or water eliminating agent. As mentioned supra, suitable coating agents are selected from the group consisting of boric acid, citric acid, and combinations thereof. The coating component of the additives work by coating and therefore isolating the oxide particle from a complete exposure or contact by other reactants.

Suitable water getters are derived from the class of polymeric organic compounds comprising the lignophosphonates. The lignophosphonate compounds serve to keep water from quickly reacting with the phosphates. In essence, these ligno-compounds scavenge up any water to prevent rapid hydration of the phosphate. Alkaline lignophosphonate compounds are preferable getters, particularly those selected from the group consisting of lignosulphonate, lignophosphonates and other hydroxylated organic compounds and combinations thereof. A suitable group of lignosulphonate compounds consists of sodium lignosulphonate, calcium lignosulphonate, potassium lignosulphonate and combinations thereof. One exemplary lignosulphonate compound is DARATARD 17™, available through Grace Construction Products of Cambridge, Mass.

Weight percents of the additive agents to the final reaction liquor can vary, with values of between 0.5 percent and 3.5 percent suitable. Generally, the additive is combined with the first mixture in an additive to oxide to phosphate weight ratio of between 1.83:10.3:35 to 2.1:10.3:34

The inventors have found that the water-isolating effect of lignosulphonate compounds is enhanced with the presence of boric acid, wherein boric acid is present in weight percents similar to those utilized for the lignophosphonates.

The additive agent can be added anytime before or at the initiation of the reaction process 24, with exemplary results obtained when the additive is introduced as designated in FIG. 1, that is, prior to the addition of water 22.

In one embodiment, proportions of each ingredient of the final, pumpable product are as follows: MgO (12 weight percent), $KH_2PO_4$ (40 weight percent), fly ash (17 weight percent), boric acid (1 weight percent), lignosulfonate (1 weight percent), and water (29 weight percent). This embodiment results in the slurry having the consistency of milk, and therefore easily pumped or grouted. After two to three hours, the slurry sets into a hard and dense ceramic. X-ray diffraction analysis of the final form, as depicted in FIG. 2. Along with hydrated magnesium potassium phosphate, also present is residual magnesium oxide.

As can be determined in Table 1 below, a myriad of different slurry consistencies result from varying concentrations of the additives. Table 1 shows the viscosities in centipoises (cp) for additive concentrations of between 0.5 and 3.5 weight percent to the total slurry weight.

TABLE 1

Viscosities of ceramic-waste liquors depending on variations in additive concentrations.

| Additive Concen. (Wt %) | Initial Viscosity (Centipoise) | Waste Particles <200 μm Wt % | Set Time (Min) | Final Hardness (Psi) |
|---|---|---|---|---|
| 0.0 | 27,000 | 60 | 20 | >8000 |
| 2.0 | 300 | 15 | >190 | >3000 |
| 2.5 | 3000 | 28 | 190 | >3000 |

Inasmuch as spraying and injection applications are enhanced at viscosity values less than 1,500 cp, formulations containing between 0.5 and 3 weight percent coating agent of additive (which comprises both a coating agent and a water "getter") are suitable.

Several different types of waste material can be incorporated with the pumpable ceramic binder, either separately or combined, to form a waste form. Such wastes include, but are not limited to ash, saw dust, clay, soils, red mud, dust from metal industries, slags, and combinations thereof. Sizing, grinding or other pretreatment of the material may be necessary. Suitable micron sizes of the waste range from 10 microns to 200 microns.

The resulting slurry, as described supra, can be utilized either neat to dispose of the already-incorporated waste particles in the pumpable liquor, or used as a sealant agent to stabilize other waste. For example, a slurry formulated with ash can be subsequently injected into contaminated soil for stabilization of the latter. Another application is the use of the invented waste-containing slurry as a pumpable refractory.

While the invention has been described with reference to details of the illustrated embodiment, these details are not intended to limit the scope of the invention as defined in the appended claims.

The embodiment of the invention in which an exclusive property or privilege is claimed is defined as follows:

1. An ambient temperature-setting pumpable ceramic composition comprising an inorganic oxide, an acidic potassium phosphate, and a material which coats the oxide, wherein the material contains organic compounds, in a material to oxide to phosphate weight ratio of between 1.83:10.3:35 to 2.1:10.3:34.

2. The composition as recited in claim 1 wherein the coating material comprises a polymeric organic material.

3. The composition as recited in claim 2 wherein the polymeric organic material is an alkaline lignosulphonate selected from the group consisting of sodium lignosulphonate, calcium lignosulphonate, potassium lignosulphonate and combinations thereof.

4. The composition as recited in claim 1 wherein the coating material is present in the composition in a weight percent of between approximately 1 weight percent and 3 weight percent.

5. The composition as recited in claim 2 wherein the polymeric organic material is combined with boric acid in a weight ratio of between approximately 0.6:1.25 and 1:1.

6. The composition as recited in claim 1 further comprising waste material in a weight percent of between 15 and 20.

7. The composition as recited in claim 6 wherein the composition exhibits a viscosity of between approximately 850 centipoises and 15,000 centipoises for more than one hour after initial mixing.

8. The composition as recited in claim 6 wherein the composition is formed without the addition of heat.

9. The composition as recited in claim 1 wherein the inorganic oxide has a surface area of between 0.3 $m^2$/gram and 0.55 $m^2$/g.

10. A pumpable ceramic-based waste formulation comprising 7 to 14 weight percent MgO, 25 to 40 weight percent $KH_2PO_4$, 15 to 50 weight percent ash, 1 to 4 weight perce acid, 0.5 to 2 weight percent lignosulphonate, and 15 to 25 weight percent water.

11. A pumpable ceramic-based waste formulation comprising 10 weight percent MgO, 35 weight percent $KH_2PO_4$, 15 weight percent fly ash, 1.2 weight percent boric acid, 0.61 weight percent lignosulphonate and 23 weight percent water.

12. A method for preparing a pumpable ceramic-based waste form comprising:

a) pretreating inorganic oxides to reduce the solubility of the inorganic oxides in phosphoric acid;

b) mixing the pretreated oxides with acidic potassium phosphate powder and waste to form a first mixture;

c) combining an additive to the first mixture to create a second mixture;

d) adding water to the second mixture to create a reactive mixture;

e) homogenizing the reactive mixture; and f) allowing the reactive mixture to cure.

13. The method as recited in claim 12 wherein the solubility of the inorganic oxides is determined by using $H_2PO_4$ as a solvent at pH 8.

14. The method as recited in claim 12 wherein the additive is combined with the first mixture in an additive to oxide to phosphate weight ratio of between 1.83:10.3:35 to 2.1:10.3:34.

15. The method as recited in claim 12 wherein the homogenized reaction mixture has a viscosity of between 200 cp and 1,000 cp.

16. The method as recited in claim 12 wherein the additive comprises a lignophosphonate compound.

17. The method as recited in claim 16 wherein the lignophosphonate compound is combined with boric acid in a weight ratio of between 1:1 and 2:1.

* * * * *

UNITED STATES PATENT AND TRADEMARK OFFICE
CERTIFICATE OF CORRECTION

PATENT NO.    : 6,204,214 B1
DATED         : March 20, 2001
INVENTOR(S)   : Dileep Singh, et al It is certified that error appears in the above-identified patent and that said Letters Patent is hereby corrected as shown below:

<u>Column 8,</u>
Line 27, after the word "weight," delete "perce," and insert the word -- percent --.

Signed and Sealed this

Eleventh Day of September, 2001

*Attest:*

*Attesting Officer*

NICHOLAS P. GODICI
*Acting Director of the United States Patent and Trademark Office*